(12) United States Patent
Nordbruch

(10) Patent No.: US 9,910,437 B2
(45) Date of Patent: Mar. 6, 2018

(54) METHOD AND SYSTEM FOR OPERATING A MOTOR VEHICLE

(71) Applicant: Robert Bosch GmbH, Stuttgart (DE)

(72) Inventor: Stefan Nordbruch, Kornwestheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 0 days.

(21) Appl. No.: 15/257,639

(22) Filed: Sep. 6, 2016

(65) Prior Publication Data
US 2017/0075352 A1    Mar. 16, 2017

(30) Foreign Application Priority Data
Sep. 11, 2015   (DE) .................. 10 2015 217 386

(51) Int. Cl.
| | |
|---|---|
| *G01C 21/36* | (2006.01) |
| *B60R 21/00* | (2006.01) |
| *B60R 21/0132* | (2006.01) |
| *B60T 7/22* | (2006.01) |
| *B60W 40/10* | (2012.01) |
| *B60W 30/18* | (2012.01) |
| *G05D 1/02* | (2006.01) |
| *B62D 15/02* | (2006.01) |

(52) U.S. Cl.
CPC .......... *G05D 1/021* (2013.01); *B62D 15/0285* (2013.01); *G01C 21/36* (2013.01); *G05D 1/0257* (2013.01); *G05D 2201/0213* (2013.01)

(58) Field of Classification Search
CPC ..... G01C 21/36; G06F 19/345; G01S 13/931; B60R 21/00; B60R 21/0132; B60R 21/0133; B60W 30/18; G05D 1/0212
See application file for complete search history.

(56) References Cited

U.S. PATENT DOCUMENTS 5,629,847 A * 5/1997 Shirakawa .......... B60R 21/0133
                                                                180/282
9,199,643 B1 * 12/2015 Zeng ..................... B60W 40/10
(Continued)

FOREIGN PATENT DOCUMENTS

DE        102012222562 A1    6/2014

*Primary Examiner* — Yuri Kan
(74) *Attorney, Agent, or Firm* — Norton Rose Fulbright US LLP; Gerard Messina

(57) ABSTRACT

A method for operating a motor vehicle, including a first control unit, a second control unit configured separately from the first control unit and a surroundings sensor system for detecting motor vehicle surroundings, including: detecting the vehicle surroundings with the surroundings sensor system to ascertain surroundings data corresponding to the detected surroundings, checking with the first control unit based on the ascertained surroundings data, whether there is an object in the vehicle surroundings which could with a predetermined probability collide with the vehicle, to ascertain a first checking result, checking with the second control unit, based on the ascertained surroundings data, whether there is an object in the vehicle surroundings which could with a predetermined probability collide with the vehicle, to ascertain a second checking result, comparing the two checking results, driverless guidance of the vehicle, based on the comparison. Also described is a system, motor vehicle and computer program.

18 Claims, 2 Drawing Sheets

(56) References Cited

U.S. PATENT DOCUMENTS

| | | | | |
|---|---|---|---|---|
| 2010/0099353 A1* | 4/2010 | Komori | ............ | G08G 1/096716 |
| | | | | 455/39 |
| 2013/0054093 A1* | 2/2013 | Furst | .................. | B60R 21/0132 |
| | | | | 701/45 |
| 2013/0332061 A1* | 12/2013 | Dowdall | ................. | B60R 21/00 |
| | | | | 701/301 |
| 2015/0012166 A1* | 1/2015 | Hauler | ................. | G05D 1/0212 |
| | | | | 701/23 |
| 2015/0336547 A1* | 11/2015 | Dagan | ....................... | B60T 7/22 |
| | | | | 701/70 |
| 2016/0001781 A1* | 1/2016 | Fung | .................... | G06F 19/345 |
| | | | | 701/36 |
| 2016/0107643 A1* | 4/2016 | Mizutani | ............... | G01S 13/931 |
| | | | | 701/519 |
| 2017/0021835 A1* | 1/2017 | Kojima | ................ | B60W 30/18 |

\* cited by examiner

METHOD AND SYSTEM FOR OPERATING A MOTOR VEHICLE

RELATED APPLICATION INFORMATION

The present application claims priority to and the benefit of German patent application no. 10 2015 217 386.0, which was filed in Germany on Sep. 11, 2015, the disclosure of which is incorporated herein by reference.

FIELD OF THE INVENTION

The present invention relates to a method and a system for operating a motor vehicle. The present invention relates to a motor vehicle and a computer program.

BACKGROUND INFORMATION

Unexamined German Patent Publication DE 10 2012 222 562 A1 describes a system for managed parking areas for transferring a vehicle from a starting position to a target position.

In fully automated (autonomous), so-called valet parking, a motor vehicle is parked by its driver at a drop-off point, for example, in front of a parking garage, and then the motor vehicle drives itself away from there into a parking position/parking bay and then back to the drop-off point.

In fully automated, so-called valet parking, it is important for the autonomously driving motor vehicle not to cause any accidents, for example, by colliding with an object inside the parking facility.

A surroundings sensor system is usually provided to detect a motor vehicle's surroundings, which ascertains surroundings data corresponding to the detected surroundings. The ascertained surroundings data are usually analyzed for objects, which could become a hazard for the motor vehicle with regard to a collision.

SUMMARY OF THE INVENTION

The object underlying the present invention may be seen as providing an efficient concept for efficiently operating a motor vehicle.

This object is achieved by the respective subject matter of the independent descriptions herein. Advantageous embodiments of the present invention are the subject matter of the dependent descriptions herein.

According to one aspect, a method for operating a motor vehicle is provided, the motor vehicle including a first control unit, a second control unit configured separately from the first control unit and a surroundings sensor system for detecting the motor vehicle's surroundings, including the following steps:
  detecting the surroundings of the motor vehicle with the aid of the surroundings sensor system to ascertain surroundings data corresponding to the detected surroundings,
  checking with the aid of the first control unit, based on the ascertained surroundings data, whether there is an object in the surroundings of the motor vehicle, which could with a predetermined probability collide with the motor vehicle, to ascertain a first checking result,
  checking with the aid of the second control unit, based on the surroundings data ascertained, whether there is an object in the surroundings of the motor vehicle, which could with a predetermined possibility collide with the motor vehicle, to ascertain a second checking result,
  comparing the two checking results,
  driverless guidance of the motor vehicle, based on the comparison.

According to another aspect, a system for operating a motor vehicle is provided, including:
  a first control unit, which is configured, based on surroundings data which correspond to surroundings detected with the aid of a surroundings sensor system of the motor vehicle, to check on whether there is an object in the surroundings of the motor vehicle which could with a predetermined probability collide with the motor vehicle to ascertain a first checking result,
  a second control unit, which is configured separately from the first control unit, which is configured, based on the ascertained surroundings data to check whether there is an object in the surroundings of the motor vehicle which could with a predetermined probability collide with the motor vehicle, to ascertain a second checking result,
  a comparator for comparing the two checking results,
  a guiding device for driverless guidance of the motor vehicle, which is configured for driverless guidance of the motor vehicle, based on this comparison.

According to another aspect, a motor vehicle is provided, including the system for operating a motor vehicle.

According to another aspect, a computer program is provided, including program code for carrying out the method for operating a motor vehicle when the computer program is executed on a computer.

The present invention thus includes in particular and, among other things, the idea that two control units of the motor vehicle, which are configured separately from one another, check whether, based on the same surroundings data, there is an object in the surroundings of the motor vehicle, which could with a predetermined probability collide with the motor vehicle. The two checking results are compared with one another, whereby the driverless motor vehicle is guided and/or driven, respectively, based on the comparison. This in particular yields the technical advantage that the motor vehicle may be operated efficiently. In particular, this yields the technical advantage that redundant testing of surroundings data is carried out. For example, if one of the control units has a malfunction, this malfunction may be detected, for example, as part of the comparison.

That the motor vehicle is driven without a driver means or indicates that the motor vehicle is not being steered or driven by a human driver or a human motor vehicle driver. Driving without a driver includes, for example, that the motor vehicle is being remotely controlled. This means, for example, that remote control commands are transmitted to the motor vehicle. Driving without a driver includes, for example, the fact that the motor vehicle is being driven autonomously, i.e., independently. For example, mixed forms are provided, i.e., the motor vehicle is remotely controlled for one stretch and another stretch is driven autonomously.

For example, it is provided that a target position inside the parking facility is transmitted to the motor vehicle, the motor vehicle then driving to this target position autonomously, i.e., independently. The motor vehicle itself navigates, for example, to the target position based on a digital map of the parking facility. This digital map is transmitted to the motor vehicle, for example, via a communications network. In general, information about the communications network, which is relevant for autonomous driving inside the parking facility, is transmitted to the motor vehicle. The motor vehicle then drives autonomously inside the parking facility, in particular to the target position, based on this information. Such information includes, for example: positions of other motor vehicles, speed data of other motor vehicles, a target trajectory to be driven by the motor vehicle.

In another specific embodiment, it is provided that driverless driving of the motor vehicle includes that the motor vehicle stops automatically when the comparison reveals that at least one of the checking results confirms that there is a corresponding object in the surroundings of the motor vehicle, even when the other test result confirms that the surroundings are free of a corresponding object.

Therefore, this yields in particular the technical advantage that a risk of a collision or an accident relating to a collision between the motor vehicle and an object in the surroundings of the motor vehicle may be diminished or reduced efficiently, because a single check result that there is an object in the surroundings of the motor vehicle, which could with a predetermined probability collide with the motor vehicle, is sufficient for the motor vehicle to stop automatically. This is the case even if the other check result has revealed that the surroundings of the motor vehicle are free of such an object. Thus if, for example, the control unit, which has come to the incorrect result, namely that the surroundings of the motor vehicle are free of such an object, has a malfunction which has resulted in this incorrect result, such a malfunction will no longer automatically result in a collision with this object because if the other control unit has carried out its check correctly, i.e., has come to the correct result that there is a corresponding object in the surroundings of the motor vehicle, then this motor vehicle will stop automatically.

In other words, malfunctions in one control unit may be compensated for advantageously with the aid of the other control unit.

An object in the surroundings of the motor vehicle is, for example, a traffic participant. A traffic participant is, for example, another motor vehicle, a bicycle rider or a pedestrian.

According to one specific embodiment, it is provided that the motor vehicle is inside a parking facility. In other words, the motor vehicle is driven without a driver inside the parking facility.

According to one specific embodiment, it is provided that the motor vehicle carries out an automatic parking operation, for example, inside the parking facility. Such an automatic parking operation may be referred to as an AVP operation, where "AVP" stands for "automated valet parking." Iman automatic parking operation, it is provided, for example, that the motor vehicle is driven without a driver from a drop-off point, where a driver of the motor vehicle has parked his or her motor vehicle for carrying out this AVP operation, to a parking position inside the parking facility. In the AVP operation, for example, it is provided that the motor vehicle is parked automatically, i.e., without a driver, in the parking position. In the AVP operation, for example, it is provided that the motor vehicle drives without a driver from the parking position to a pickup position where a person is able to pick up the motor vehicle. The pickup position is, for example, identical to or different from the drop-off point.

A parking facility in the sense of the present invention may be defined as a parking area and functions as a parking lot for vehicles. The parking facility thus forms a cohesive area having multiple parking spaces (in the case of a parking facility on private property) or parking positions (in the case of a parking facility on public property). According to one specific embodiment, the parking facility is configured as a parking deck. According to one specific embodiment, the parking facility is configured as a parking garage.

A communications network in the sense of the present invention includes in particular a WLAN communications network and/or a mobile network and/or a communications network according to the LoRa standard. "LoRa" stands for "low power wide range communication." Thus, according to a specific embodiment, the communications network includes a LoRa communications network.

In another specific embodiment, a communication over the communications network is or will be encrypted, respectively.

The phrase "respectively" includes in particular the phrase "and/or."

A surroundings sensor system includes one or multiple surroundings sensors. A surroundings sensor is, for example, one of the following surroundings sensors: video sensors, laser sensors, ultrasonic sensors, LIDAR sensors, magnetic sensors or radar sensors.

In another specific embodiment, it is provided that the surroundings data are transmitted from the surroundings sensor system to one of the two control units, whereby one of the two control units transmits the surroundings data to the other one of the two control units.

This yields in particular the technical advantage that the other one of the two control units, which receives the surroundings data from the one of the two control units, need not itself be connected directly to the surroundings sensor system to receive the surroundings data. This therefore yields the technical advantage that, for example, a corresponding design or a corresponding wiring in the motor vehicle may be carried out efficiently and easily and without taking up much time.

According to one specific embodiment, it is provided that the surroundings data are transmitted from the surroundings sensor system to both control units.

This yields in particular the technical advantage that both control units, independently of one another, may receive the surroundings data from the surroundings sensor system. Thus, for example, if one of the control units transmits the surroundings data to the other one of the two control units, the transmitting control unit cannot falsify these surroundings data within the scope of the transmission due to a malfunction.

According to another specific embodiment, it is provided that one of the two control units is a main unit of an infotainment system of the motor vehicle.

This yields in particular the technical advantage that the main unit of the infotainment system of the motor vehicle may be utilized efficiently. This means that the main unit of the infotainment system also takes over the additional function of checking on the surroundings data in addition to the original function.

According to another specific embodiment, it is provided that one of the two control units is a control unit of a driver assistance system, in particular a parking assistant.

Therefore, this yields in particular the technical advantage that the control unit of the driver assistance system, in particular the parking assistant, may be utilized efficiently similar to the main unit of the infotainment system.

According to another specific embodiment, it is provided that one of the two control units is a control unit of a guiding device for driverless guidance of the motor vehicle.

This yields in particular the technical advantage that the control unit of the guiding device may be utilized efficiently similar to the main unit of the infotainment system.

According to another specific embodiment, it is provided that the comparison is carried out with the aid of one of the two control units.

This yields in particular the technical advantage that one of the two control units may be utilized efficiently. This means that this control unit carries out two functions in particular: checking and comparing.

According to one specific embodiment, it is provided that the system for operating a motor vehicle is configured or configured to carry out or execute the method for operating a motor vehicle.

According to another specific embodiment, it is provided that the method for operating a motor vehicle is executed or carried out with the aid of the system for operating a motor vehicle.

Technical functionalities of the system are derived similarly from corresponding technical functionalities of the method and vice versa.

According to one specific embodiment, it is provided that the system includes a surroundings sensor system.

According to another specific embodiment, it is provided that the motor vehicle includes a surroundings sensor system.

In another specific embodiment, it is provided that the guiding device is configured to stop the motor vehicle automatically when the comparison reveals that at least one of the checking results confirms that a corresponding object is in the surroundings of the motor vehicle even if the other checking result confirms that the surroundings are free of a corresponding object.

In another specific embodiment, it is provided that a surroundings sensor system is provided for detecting the surroundings of a motor vehicle to ascertain surroundings data corresponding to the detected surroundings, one of the two control units being connected to the surroundings sensor system, so that the surroundings sensor system is able to transmit the ascertained surroundings data to the one of the two control units, one of the two control units being configured to transmit the ascertained surroundings data to the other one of the two control units.

In other words, for example, only the one of the two control units is connected to the surroundings sensor system, the other one of the two control units then being connected to one of the two control units to obtain the surroundings data from one of the two control units. The other one of the two control units is free of a connection to the surroundings sensor system, i.e., it is not connected to it.

According to one specific embodiment, it is provided that a surroundings sensor system is provided for detecting the surroundings of a motor vehicle to ascertain the surroundings data corresponding to the detected surroundings, each of the two control units being connected to the surroundings sensor system, so that the surroundings sensor system is able to transmit the ascertained surroundings data to both control units.

In other words, for example, both control units are connected independently of one another to the surroundings sensor system to receive surroundings data therefrom.

In another specific embodiment, it is provided that both control units are connected independently of one another to the surroundings sensor system to obtain the surroundings data from it, it being additionally provided that both control units are connected to one another in order to transmit surroundings data from one control unit to the other one of the two control units, for example.

A connection between the control units or between the control units and the surroundings sensor system is established, for example, with the aid of a bus system, for example, with the aid of a CAN bus or with the aid of a Flexray bus.

According to a further specific embodiment, it is provided that one of the two control units is a main unit of an infotainment system of the motor vehicle.

In another specific embodiment, it is provided that one of the two control units is a control unit of a driver assistance system, in particular a parking assistant.

According to another specific embodiment, it is provided that one of the two control units is a control unit of the guiding device.

According to one specific embodiment, an infotainment system is provided including a main unit.

According to a further specific embodiment, a driver assistance system, in particular a parking assistant, is provided, the driver assistance system including a control unit.

According to another specific embodiment, the guiding device includes a control unit.

According to a further specific embodiment it is provided that the comparator is one of the two control units, so that the comparison may be carried out with the aid of one of the two control units.

Control units, such as those used within the scope of the concept according to the present invention, are configured as the following control units, for example: AVP control unit, control unit of a parking assistant, control unit of a main unit ("head unit") of an infotainment system. Additional control units present in the motor vehicle are also used in a further specific embodiment within the scope of the concept according to the present invention.

In one specific embodiment, it is provided that one of the two control units is an AVP control unit for carrying out an automatic parking operation.

The present invention is described in greater detail below on the basis of exemplary embodiments. The same reference numerals may be used below for the same features.

DETAILED DESCRIPTION

Figure 1:
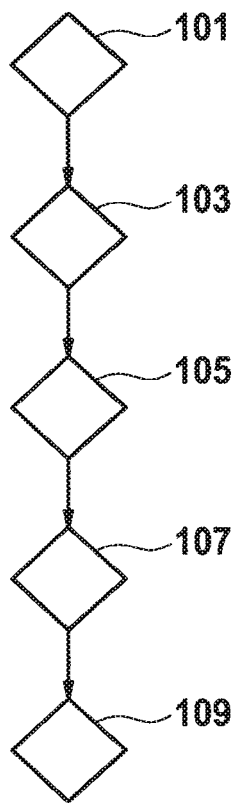
FIG. 1 shows a flow chart of a method for operating a motor vehicle.

FIG. 1 shows a flow chart of a method for operating a motor vehicle, the motor vehicle including a first control unit, a second control unit configured separately from the first control unit and a surroundings sensor system for detecting the surroundings of the motor vehicle.

The method includes the following steps:

detecting 101 the surroundings of a motor vehicle with the aid of the surroundings sensor system to ascertain surroundings data corresponding to the detected surroundings, checking 103 with the aid of the first control unit, based on the ascertained surroundings data, whether there is an object in the surroundings of the motor vehicle which could with a predetermined probability collide with the motor vehicle, to ascertain a first checking result, checking 105 with the aid of the second control unit, based on the ascertained surroundings data, whether there is an object in the surroundings of the motor vehicle which could with a predetermined probability collide with the motor vehicle, to ascertain a second checking result, comparing 107 the two checking results,
driverless guidance 109 of the motor vehicle, based on the comparison.

In a specific embodiment (not shown), it is provided that driverless driving of the motor vehicle includes that the motor vehicle stops automatically when the comparison reveals that at least one of the checking results confirms that a corresponding object is situated in the surroundings of the motor vehicle, even if the other checking result confirms that the surroundings are free of a corresponding object.

In other words, when the first control unit, for example, determines that there is a corresponding object in the surroundings, but the second control unit determines that there is no corresponding object in the surroundings of the motor vehicle, the motor vehicle will nevertheless stop automatically because, as a trigger signal, it is sufficient for stopping that one of the two checking results indicates that there is an object in the surroundings of the motor vehicle which could with a predetermined probability collide with the motor vehicle.

Figure 2:
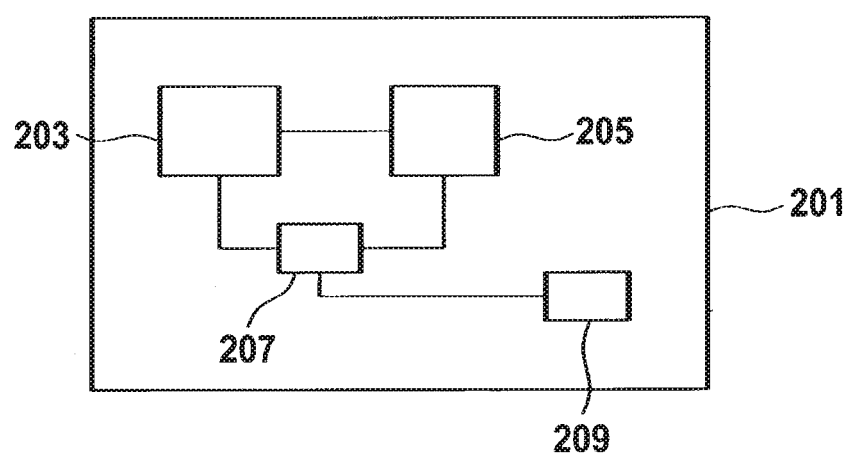
FIG. 2 shows a system for operating a motor vehicle.

FIG. 2 shows a system 201 for operating a motor vehicle.
System 201 includes:
- a first control unit 203, which is configured, based on surroundings data which correspond to surroundings detected with the aid of a surroundings sensor system of the motor vehicle, to check whether there is an object in the surroundings of the motor vehicle which could with a predetermined probability collide with the motor vehicle, to ascertain a first checking result,
- a second control unit 205, which is configured separately from the first control unit, and is configured, based on the ascertained surroundings data, to check whether there is an object in the surroundings of the motor vehicle which could with a predetermined probability collide with the motor vehicle, to ascertain a second checking result,
- a comparator 207 for comparing the two checking results,
- a guiding device 209 for driverless guidance of the motor vehicle, which is configured for driverless guiding of the motor vehicle, based on this comparison.

In a specific embodiment (not shown), system 201 includes a surroundings sensor system for detecting the surroundings of the motor vehicle.

In a specific embodiment (not shown), it is provided that comparator 207 is included either by first control unit 203 or by second control unit 205. For example, according to another specific embodiment, it is provided that the first or the second control unit 203, 205 is configured to compare the two checking results. In other words, the comparison is carried out with the aid of one of two control units 203, 205 or with the aid of both control units 203, 205.

In another specific embodiment (not shown), it is provided that guiding device 209 is included by one of the two control units 203, 205. For example, it is provided that first control unit 203 or second control unit 205 is configured for driverless guiding of the motor vehicle, based on the comparison.

Figure 3:
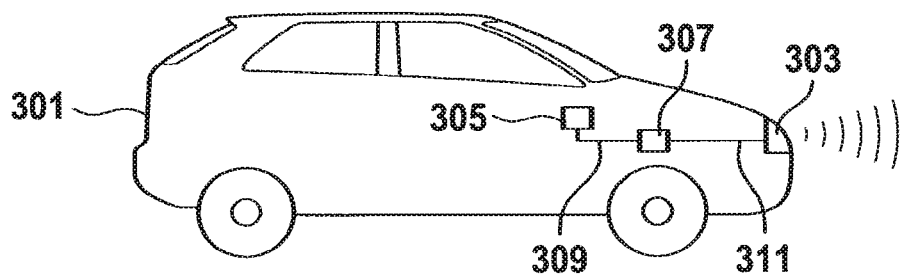
FIG. 3 shows a motor vehicle.

FIG. 3 shows a motor vehicle 301.
Motor vehicle 301 has on the front a surroundings sensor system 303, which includes a radar sensor, for example. Motor vehicle 301 also includes a first control unit 305, which is a control unit of a guiding device for driverless guidance of the motor vehicle. Control unit 305 may also be identified as an AVP control unit. Motor vehicle 301 also includes a second control unit 307, which is a control unit of a parking assistant. First control unit 305 is connected to second control unit 307 with the aid of a data line 309. Second control unit 307 is connected to surroundings sensor system 303, i.e., in particular to the radar sensor, with the aid of another data line 311.

In other words, the surroundings data are transmitted from surroundings sensor system 303 to second control unit 307. Second control unit 307 then transmits these surroundings data further to first control unit 305. It is provided in motor vehicle 301 that first control unit is not connected to surroundings sensor system 303, i.e., more specifically is not connected directly to surroundings sensor system 303 but instead is connected indirectly via second control unit 307.

Figure 4:
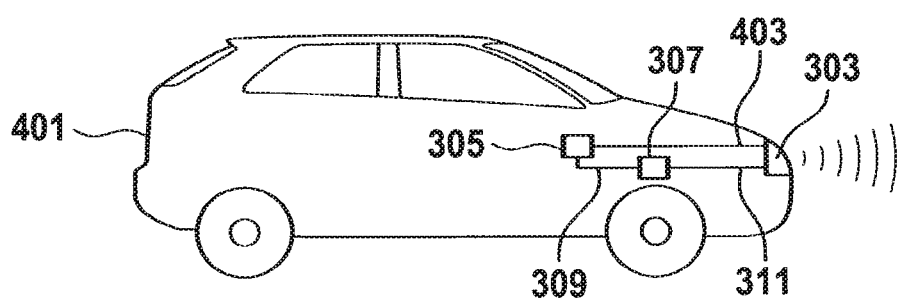
FIG. 4 shows another motor vehicle.

FIG. 4 shows another motor vehicle 401.
Similar to motor vehicle 301 in FIG. 3, motor vehicle 401 also includes first control unit 305 and second control unit 307. Here again, the second control unit is connected with the aid of a data line 311 to surroundings sensor system 303. First control unit 305 is connected to second control unit 307 with the aid of a data line 309. In addition, however, first control unit 305 is connected directly to the surroundings sensor system with the aid of a data line 403. Therefore, surroundings sensor system 303 is thus able to transmit the surroundings data directly to first control unit 305, so that first control unit 305 is then also able to check or analyze these surroundings data even if second control unit 307 has failed, for example, and is unable to transmit any more surroundings data.

First and second control units 305, 307 are both configured according to one specific embodiment to drive the motor vehicle without a driver. This is based on remote control commands, for example, and based on driving data. According to one specific embodiment, such remote control commands and driving data are received with the aid of a communications interface (not shown) of motor vehicle 301 and 401 via a communications network.

During operation of motor vehicle 301 and 401, motor vehicle 301 and 401 drive without a driver within a parking facility, for example. This is within the scope of an AVP operation, for example. Surroundings sensor system 303 of motor vehicle 301 and 401 detects the surroundings and ascertains surroundings data corresponding to the detected surroundings. These surroundings data are thus checked with the aid of first control unit 305 and also with the aid of second control unit 307 for whether there is an object in the surrounding of motor vehicle 301 and 401 which could with a predetermined probability collide with motor vehicle 301, 401. The two checking results are compared with one another. This takes place with the aid of first control unit 305 and second control unit 307, for example. Based on the comparison, motor vehicle 301, 401, for example, is then driven without a driver with the aid of first control unit 205 or with the aid of second control unit 307.

The present invention thus includes in particular and, among other things, the idea of providing an efficient technical concept, based on which, an analysis of surroundings data by one control unit is verified by another control unit.

For example, according to one specific embodiment, it is provided that the surroundings data are verified and checked with the aid of AVP control unit 305.

In another specific embodiment, it is provided that the surroundings data are checked or analyzed with the aid of a control unit of surroundings sensor system 303. In other words, the surroundings sensor system may in general also include a control unit, which carries out a check of the surroundings data.

According to one specific embodiment, it is provided that the surroundings data are checked with the aid of the control unit of the surroundings sensor system as well as with the aid of AVP control unit 305, so that the surroundings data are analyzed and checked redundantly.

If it is ascertained in one of the two analyses that an object is present in the surroundings of the motor vehicle which could with a predetermined probability collide with the motor vehicle, then it is assumed for safety reasons that such an object is in fact also present, even if the other one of the two analyses has revealed that there is no object in the surroundings of the motor vehicle.

In one specific embodiment, it is provided that AVP control unit 305 has a direct link to the surroundings sensor system and/or to the surroundings sensors of the surroundings sensor system. This yields the technical advantage in particular that the surroundings data, which are measured data, cannot be falsified by control unit 307 of the parking assistant. In particular this yields the technical advantage that, even if control unit 307 of the parking assistant fails, it is still possible to carry out analyses with the aid of AVP control unit 305.

According to one specific embodiment, the surroundings sensor system includes one or multiple of the following surroundings sensors: radar sensor, video sensor, LIDAR sensor, ultrasonic sensor, magnetic sensor and laser sensor. The respective surroundings sensors each detect surroundings of the motor vehicle and ascertain surroundings data corresponding to the respective detected surroundings.

In one specific embodiment, it is provided that the respective surroundings data of the individual surroundings sensors are each checked, independently of one another, with the aid of the first control unit and the second control unit.

According to one specific embodiment, it is provided that the redundancy calculations are carried out on AVP control unit 305.

For example, according to one specific embodiment, it is provided that a so-called head unit (main unit) of an infotainment system is one of the two control units. In this case the head unit, i.e., the main unit, then carries out the redundancy calculation.

The advantage according to the present invention is to be seen in particular in the fact that there is an increased certainty due to the redundant calculation and the redundant checking.

A control unit may also be referred to in general as an ECU. ECU stands for electronic control unit.

What is claimed is:

1. A method for operating a motor vehicle, the motor vehicle including a first control unit, a second control unit configured separately from the first control unit and a surroundings sensor system for detecting a surroundings of the motor vehicle, the method comprising:
    detecting the surroundings of the motor vehicle with the surroundings sensor system to ascertain surroundings data corresponding to the detected surroundings;
    checking with the first control unit, based on the ascertained surroundings data, whether there is an object in the surroundings of the motor vehicle which could with a predetermined probability collide with the motor vehicle, to ascertain a first checking result;
    checking with the second control unit, based on the ascertained surroundings data, whether the object is in the surroundings of the motor vehicle which could with a predetermined probability collide with the motor vehicle, to ascertain a second checking result;
    comparing the two checking results; and
    providing driverless guidance of the motor vehicle based on the comparison, wherein the driverless guidance of the motor vehicle includes a fact that the motor vehicle stops automatically when the comparison reveals that at least one of the checking results confirms that the object is in the surroundings of the motor vehicle even if the other checking result confirms that the surroundings are free of the object.

2. The method of claim 1, wherein the surroundings data are transmitted from the surroundings sensor system to one of the two control units, the one of the two control units transmitting the surroundings data to the other one of the two control units.

3. The method of claim 1, wherein the surroundings data are transmitted from the surroundings sensor system to both control units.

4. The method of claim 1, wherein one of the two control units is a main unit of an infotainment system of the motor vehicle.

5. The method of claim 1, wherein one of the two control units is a control unit of a driver assistance system, in particular a parking assistant.

6. The method of claim 1, wherein one of the two control units is a control unit of a guiding device for driverless guidance of the motor vehicle.

7. The method of claim 1, wherein one of the two control units is an AVP control unit for carrying out an automatic parking operation.

8. The method of claim 1, wherein the comparison is carried out with one of the two control units.

9. A system for operating a motor vehicle, comprising:
    a first control unit, which is configured, based on surroundings data corresponding to surroundings detected with a surroundings sensor system of the motor vehicle, to check whether there is an object in the surroundings of the motor vehicle which could with a predetermined probability collide with the motor vehicle, to ascertain a first checking result,
    a second control unit which is configured separately from the first control unit, which is configured, based on the ascertained surroundings data, to check whether the object is in the surroundings of the motor vehicle which could with a predetermined probability collide with the motor vehicle, to ascertain a second checking result;
    a comparator configured for comparing the two checking results; and
    a guiding device configured for providing driverless guidance of the motor vehicle which is configured for providing driverless guidance of the motor vehicle based on the comparison,
    wherein the guiding device is configured to stop the motor vehicle automatically when the comparison reveals that at least one of the checking results confirms that the object is in the surroundings of the motor vehicle even if the other checking result confirms that the surroundings are free of the object.

10. The system of claim 9, wherein a surroundings sensor system is for detecting the surroundings of a motor vehicle to ascertain surroundings data corresponding to the detected surroundings, one of the two control units being connected to the surroundings sensor system, so that the surroundings sensor system is able to transmit the ascertained surroundings data to one of the two control units, the one of the two control units being configured to transmit the ascertained surroundings data to the other one of the two control units.

11. The system of claim 9, wherein a surroundings sensor system is for detecting the surroundings of a motor vehicle to ascertain surroundings data corresponding to the detected surroundings, each of the two control units being connected to the surroundings sensor system, so that the surroundings sensor system is able to transmit the ascertained surroundings data to both control units.

12. The system of claim 9, wherein one of the two control units is a main unit of an infotainment system of the motor vehicle.

13. The system of claim 9, wherein one of the two control units is a control unit of a driver assistance system, in particular of a parking assistant.

14. The system of claim 9, wherein one of the two control units is a control unit of the guiding device.

15. The system of claim 9, wherein the comparator is one of the two control units, so that the comparison may be carried out with the aid of one of the two control units.

16. The system of claim 9, wherein one of the two control units is an AVP control unit for carrying out an automatic parking operation.

17. A motor vehicle, comprising:
a system for operating a motor vehicle, including:
a first control unit, which is configured, based on surroundings data corresponding to surroundings detected with a surroundings sensor system of the motor vehicle, to check whether there is an object in the surroundings of the motor vehicle which could with a predetermined probability collide with the motor vehicle, to ascertain a first checking result,
a second control unit which is configured separately from the first control unit, which is configured, based on the ascertained surroundings data, to check whether the object is in the surroundings of the motor vehicle which could with a predetermined probability collide with the motor vehicle, to ascertain a second checking result;
a comparator configured for comparing the two checking results; and
a guiding device configured for providing driverless guidance of the motor vehicle which is configured for providing driverless guidance of the motor vehicle based on the comparison,
wherein the driverless guidance of the motor vehicle includes a fact that the motor vehicle stops automatically when the comparison reveals that at least one of the checking results confirms that the object is in the surroundings of the motor vehicle even if the other checking result confirms that the surroundings are free of the object.

18. A non-transitory computer readable medium having a computer program, which is executable by a processor, comprising:
a program code arrangement having program code for operating a motor vehicle, the motor vehicle including a first control unit, a second control unit configured separately from the first control unit and a surroundings sensor system for detecting a surroundings of the motor vehicle, by performing the following:
detecting the surroundings of the motor vehicle with the surroundings sensor system to ascertain surroundings data corresponding to the detected surroundings;
checking with the first control unit, based on the ascertained surroundings data, whether there is an object in the surroundings of the motor vehicle which could with a predetermined probability collide with the motor vehicle, to ascertain a first checking result;
checking with the second control unit, based on the ascertained surroundings data, whether the object is in the surroundings of the motor vehicle which could with a predetermined probability collide with the motor vehicle, to ascertain a second checking result;
comparing the two checking results; and
providing driverless guidance of the motor vehicle based on the comparison,
wherein the driverless guidance of the motor vehicle includes a fact that the motor vehicle stops automatically when the comparison reveals that at least one of the checking results confirms that the object is in the surroundings of the motor vehicle even if the other checking result confirms that the surroundings are free of the object.

* * * * *